(12) United States Patent
Montebovi

(10) Patent No.: US 7,952,487 B2
(45) Date of Patent: May 31, 2011

(54) DEVICE CHARGING

(75) Inventor: Francesco Montebovi, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 289 days.

(21) Appl. No.: 12/391,328

(22) Filed: Feb. 24, 2009

(65) Prior Publication Data

US 2010/0214107 A1  Aug. 26, 2010

(51) Int. Cl.
*G08B 21/00* (2006.01)
(52) U.S. Cl. .................. 340/636.1; 340/636.2
(58) Field of Classification Search .............. 340/636.1, 340/636.11, 636.16, 636.2, 641, 635, 542, 340/691.1, 815.4, 815.42, 815.43; 320/111; 439/490
See application file for complete search history.

(56) References Cited

U.S. PATENT DOCUMENTS

| 7,121,707 | B2 * | 10/2006 | Currie et al. | 362/555 |
| 2005/0151506 | A1 * | 7/2005 | Kennedy et al. | 320/111 |
| 2007/0032127 | A1 * | 2/2007 | Sheppard | 439/502 |

FOREIGN PATENT DOCUMENTS

| EP | 1 178 260 A1 | 2/2002 |
| EP | 1 903 658 A2 | 3/2008 |

* cited by examiner

*Primary Examiner* — Toan N Pham
(74) *Attorney, Agent, or Firm* — Snyder, Clark, Lesch & Chung, LLP

(57) ABSTRACT

A system may include a battery powered device and a cable used to charge the battery powered device. The cable may include a first connector to connect to the battery powered device and a second connector to connect to a power source. The cable may also includes a flexible portion located between the first connector and the second connector. The flexible portion may include an inner portion that includes an electrical conductor and an outer portion that includes a transparent or translucent material. The cable may further include at least one light source and circuitry to activate the light source based on a charge status of the battery powered device. The activated light source may illuminate at least a portion of the cable.

20 Claims, 8 Drawing Sheets

DEVICE CHARGING

TECHNICAL FIELD OF THE INVENTION

The invention relates generally to battery powered devices and, more particularly, to charging a battery powered device.

DESCRIPTION OF RELATED ART

Battery powered devices, such as communication devices, lap top computers, etc., have become increasingly important in every day life. For example, portable battery powered communications devices are typically used at work and at home to place and receive phone calls, to send and receive text messages, to browse the Internet, etc. As a result, keeping battery powered devices charged and available for use is very important to users.

SUMMARY

According to a first aspect, a system comprising a battery powered device and a cable is provided. The cable includes a first connector located at a first end of the cable, the first connector being configured to connect to the battery powered device and a second connector located at a second end of the cable, the second connector being configured to connect to a power source. The cable also includes a flexible portion located between the first connector and the second connector, the flexible portion including an inner portion comprising at least one electrical conductor and an outer portion comprising at least one of a transparent or translucent material. The cable further includes at least one light source, and circuitry configured to activate the at least one light source based on a charge status of the battery powered device, wherein the activated at least one light source is configured to illuminate at least a portion of the outer portion of the flexible portion.

Additionally, when activating the at least one light source, the circuitry is configured to activate a first light source when a battery included in the battery powered device is charged to a level less than a first threshold, activate a second light source when the battery is charged to a level greater than the first threshold and less than a second threshold, and activate a third light source when the battery is charged to level greater than the second threshold.

Additionally, the first threshold may correspond to approximately 10% of a full charge for the battery and the second threshold corresponds to approximately 60% of a full charge for the battery.

Additionally, the first, second and third light sources may comprise different colored light sources.

Additionally, the first light source may comprise a red light emitting diode and the third light source may comprise a green light emitting diode.

Additionally, the circuitry may comprise a controller configured to at least one of receive charge state information from the battery powered device via the first connector, or query the battery powered device for charge state information via the first connector.

Additionally, the at least one light source may comprise a first plurality of light sources configured to emit a first color of light when the battery powered device is charged to a first level, a second plurality of light sources configured to emit a second color of light when the battery powered device is charged to a second level, wherein the second level is greater than the first level, and a third plurality of light sources configured to emit a third color of light when the battery powered device is charged to a third level, wherein the third level is greater than the second level, and wherein the first, second and third pluralities of light sources are located in the flexible portion of the cable.

Additionally, the at least one light source may comprise a plurality of light sources disposed along a length of the flexible portion of the cable, wherein the circuitry is configured to activate a first number of the light sources when the charge status of the battery powered device is below a first level, activate a second number of the light sources when the charge status of the battery powered device is greater than the first level and less than a second level, and activate a third number of the light sources when the charge status of the battery powered device is greater than the second level, and wherein the first number is less than the second number and the second number is less than the third number.

Additionally, the at least one light source may comprise a plurality of light sources, and the circuitry may comprise a controller configured to activate an increasing number of the plurality of light sources as the charge level of the battery powered device increases.

Additionally, the at least one light source may comprise a plurality of light sources and the circuitry may comprise a controller configured to activate at least some of the plurality of light sources to display at least one word corresponding to a charge level of the battery powered device, the at least one word being visible on the outer portion of the flexible portion of the cable.

Additionally, the battery powered device may comprise at least one of a mobile telephone, a personal digital assistant, a laptop computer or a media playing device.

According to another aspect, a cable for charging a device is provided. The cable may include a first connector located at a first end of the cable, the first connector being configured to connect to the device, and a second connector located at a second end of the cable, the second connector being configured to connect to a power source. The cable may also include a flexible portion located between the first connector and the second connector, the flexible portion comprising at least one electrical conductor and including a transparent or translucent outer portion. The cable may further include a plurality of light sources and control circuitry. The control circuitry may be configured to activate at least one of the plurality of light sources based on a charge status of the device, wherein the activated at least one light source is configured to illuminate at least a portion of the outer portion of the flexible portion of the cable.

Additionally, when activating the at least one light source, the control circuitry may be configured to activate a first light source when a battery included in the device is charged to a level less than a first threshold, activate a second light source when the battery is charged to a level greater than the first threshold and less than a second threshold, and activate a third light source when the battery is charged to level greater than the third threshold.

Additionally, the first, second and third light sources may emit different colored light.

Additionally, the control circuitry may be configured to activate a second one of the plurality of light sources when the device receives a communication, or pulse the at least one of the plurality of light sources to provide an indication that a communication has been received.

Additionally, the control circuitry may be configured to activate an increasing number of the plurality of light sources as the device becomes more fully charged.

Additionally, the first connector may comprise a universal serial bus (USB) type connector or a USB compatible connector.

According to still another aspect, a method is provided. The method may include identifying a charge status of a battery powered device. The method may also include activating at least one of a plurality of light sources included in a charging cable coupled to the battery powered device and a power source, where the activated light source emits light through a portion of the charging cable.

Additionally, the activating may comprise activate a first portion of the plurality of light sources when the charge status of the battery powered device is less than a first threshold, activating a second portion of the plurality of light sources when the charge status of the battery powered device is greater than the first threshold and less than a second threshold, and activating a third portion of the first plurality of light source when the charge status of the battery powered device is greater than the second threshold.

Additionally, the first portion of the plurality of light sources may emit a different color of light than at least one of the second portion of the plurality of light sources or the third portion of the plurality of light sources.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary System

Figure 1:
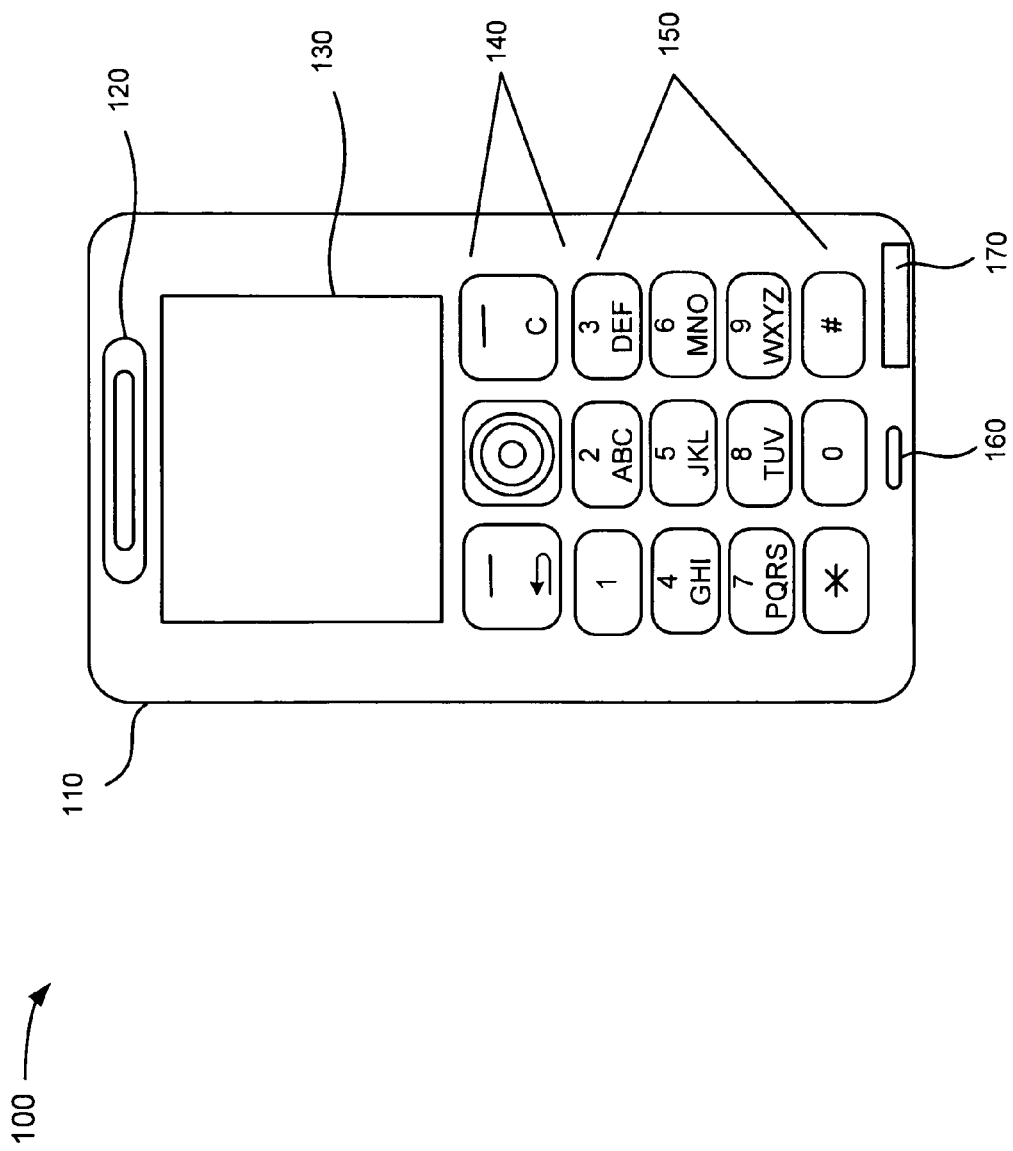
FIG. 1 is a diagram of an exemplary battery powered device.

FIG. 1 is a diagram of an exemplary user device 100 which may be used in conjunction with devices, systems and methods described herein. In an exemplary implementation, user device 100 may be a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Referring to FIG. 1, user device 100 may include housing 110, speaker 120, display 130, control buttons 140, keypad 150, microphone 160 and connector 170. Housing 110 may protect the components of user device 100 from outside elements. Speaker 120 may provide audible information to a user of user device 100.

Display 130 may provide visual information to the user. For example, display 130 may provide information regarding incoming or outgoing telephone calls and/or incoming or outgoing electronic mail (e-mail), instant messages, short message service (SMS) messages, etc. Control buttons 140 may permit the user to interact with user device 100 to cause user device 100 to perform one or more operations, such as place a telephone call, play various media, etc. For example, control buttons 140 may include a dial button, hang up button, play button, etc. Keypad 150 may include a standard telephone keypad. Microphone 160 may receive audible information from the user.

Connector 170 may be a connector or interface used for charging user device 100. In an exemplary implementation, connector 170 may be accessible from the exterior of user device 100. In one implementation, connector 170 may be a conventional or standardized connector, such as a universal serial bus (USB) connector or a USB compatible connector, that is compatible with many types of different devices, such as various charging cables. In other implementations, connector 170 may be a proprietary connector compatible with a particular charging cable. Connector 170 is shown on the front of user device 100. In other implementations, connector 170 may be located on the bottom of user device 100, on the backside of user device 100, on either side of user device 100 or on any other portion of user device 100.

Aspects of the invention are described herein in the context of charging and/or powering a portable device, such as user device 100. It should also be understood that devices, systems and methods described herein may also be used with other types of devices that may require charging/powering, such as a personal computer (PC), a laptop computer, a PDA, a media playing device (e.g., an MPEG audio layer 3 (MP3) player, a video game playing device), etc., that may not include various communication functionality for communicating with other devices.

Figure 2:
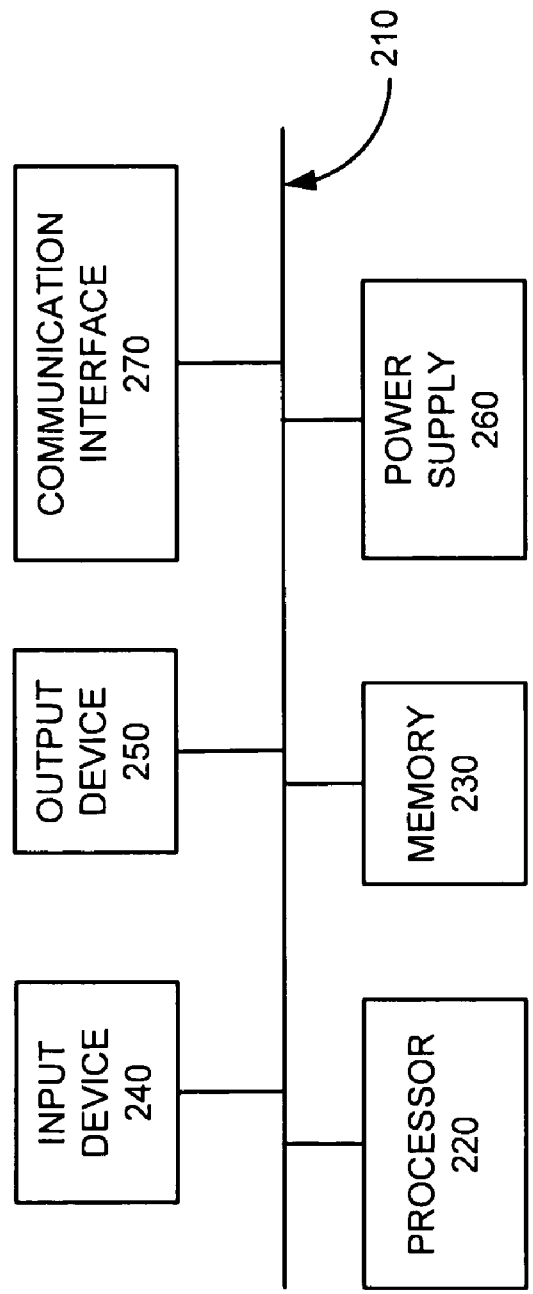
FIG. 2 is a functional block diagram of exemplary components implemented in the device of FIG. 1.

FIG. 2 is a diagram illustrating components of user device 100 according to an exemplary implementation. User device 100 may include bus 210, processor 220, memory 230, input device 240, output device 250, power supply 260 and communication interface 270. Bus 210 permits communication among the components of user device 100. One skilled in the art would recognize that user device 100 may be configured in a number of other ways and may include other or different elements. For example, user device 100 may include one or more modulators, demodulators, encoders, decoders, etc., for processing data.

Processor 220 may include a processor, microprocessor, an application specific integrated circuit (ASIC), field programmable gate array (FPGA) or other processing logic. Processor 220 may execute software instructions/programs or data structures to control operation of user device 100.

Memory 230 may include a random access memory (RAM) or another type of dynamic storage device that stores information and instructions for execution by processor 220; a read only memory (ROM) or another type of static storage device that stores static information and instructions for use by processor 220; a flash memory (e.g., an electrically erasable programmable read only memory (EEPROM)) device for storing information and instructions; and/or some other type of magnetic or optical recording medium and its corresponding drive. Memory 230 may also be used to store temporary variables or other intermediate information during execution of instructions by processor 220. Instructions used by processor 220 may also, or alternatively, be stored in another type of computer-readable medium accessible by processor 220. A computer-readable medium may include one or more memory devices.

Input device 240 may include mechanisms that permit an operator to input information to user device 100, such as microphone 160, keypad 150, control buttons 140, a keyboard (e.g., a QWERTY keyboard, a Dvorak keyboard), a gesture-based device, an OCR based device, a joystick, a virtual keyboard, a speech-to-text engine, a mouse, a pen, voice recognition and/or biometric mechanisms, etc.

Output device 250 may include one or more mechanisms that output information to the user, including a display, such as display 130, a printer, one or more speakers, such as speaker 120, etc.

Power supply 260, also referred to herein as battery 260, may include one or more batteries and/or other power source components used to provide power to user device 100. Power supply 260 may also include circuitry and/or components used to output charge level indication information to processor 220 and/or other components of user device 100. The charge level indication information may include relative charge level information that indicates a percentage of a full charge at which battery 260 is currently charged.

Communication interface 270 may include any transceiver-like mechanism that enables user device to communication with other devices. For example, communication interface 270 may include components for communicating information, such as charge level information regarding battery 260, to a device/system coupled to connector 170, such as a charging cable.

User device 100 may provide a platform for a user to make and receive telephone calls, send and receive messages (e.g., electronic mail, text messages, multi-media messages, short message service (SMS) messages, etc.), play music, play games, and execute various other applications. User device 100, as described in detail below, may also perform processing associated with charging user device 100 and displaying various information based on the charge state of user device 100. User device 100 may perform these operations in response to processor 220 executing sequences of instructions contained in a computer-readable medium, such as memory 230. Such instructions may be read into memory 230 from another computer-readable medium via, for example, communication interface 270. A computer-readable medium may include one or more memory devices. In alternative embodiments, hard-wired circuitry may be used in place of or in combination with software instructions to implement processes consistent with the invention. Thus, implementations described herein are not limited to any specific combination of hardware circuitry and software.

Figure 3:
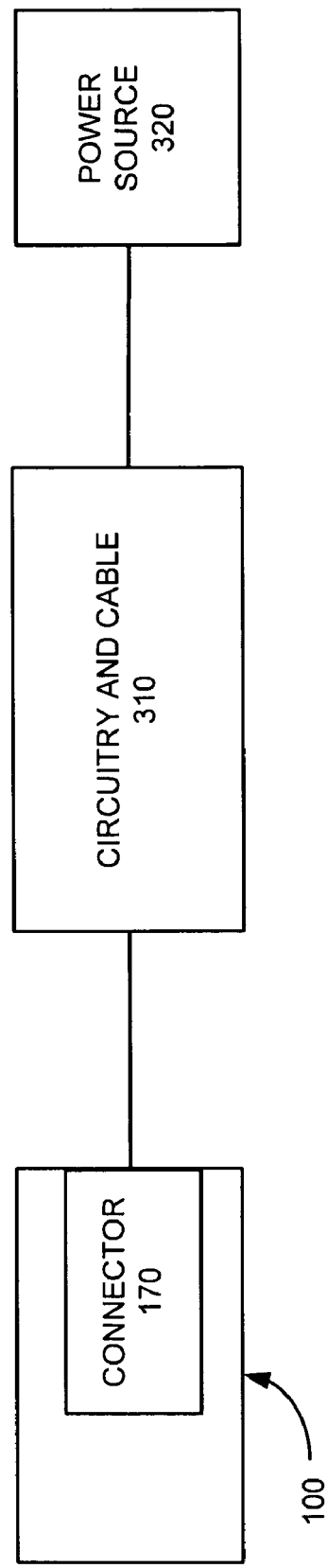
FIG. 3 is a block diagram of components used to charge the device of FIG. 1 according to an exemplary implementation.

FIG. 3 is a block diagram illustrating components used to charge user device 100 according to an exemplary implementation. Referring to FIG. 3, connector 170 of user device 100 may be coupled to circuitry and cable 310, also referred to herein as cable 310. Cable 310 may be coupled to power source 320 when user device 100 is being charged.

In an exemplary implementation, cable 310 may include circuitry for receiving information identifying the charge state of battery 260 of user device 100. Based on the particular charge state of battery 260, cable 310 may activate one or more light sources to emit light that enables a user to quickly determine the charge state of user device 100, as described in detail below.

Power source 320, as described above, may represent a power source from which user device 100 may be charged or powered. In an exemplary implementation, power source 320 may be associated with a conventional building power supply (e.g., a wall outlet/receptacle) to which user device 100 may be connected via cable 310. For example, one end of cable 310 may include a plug that connects to a wall outlet. In another implementation, power source 320 may represent another device, such as a host device or external battery pack, via which user device 100 may be charged. In each case, one end of cable 310 connects to power source 320 to charge user device 100.

Figure 4A:
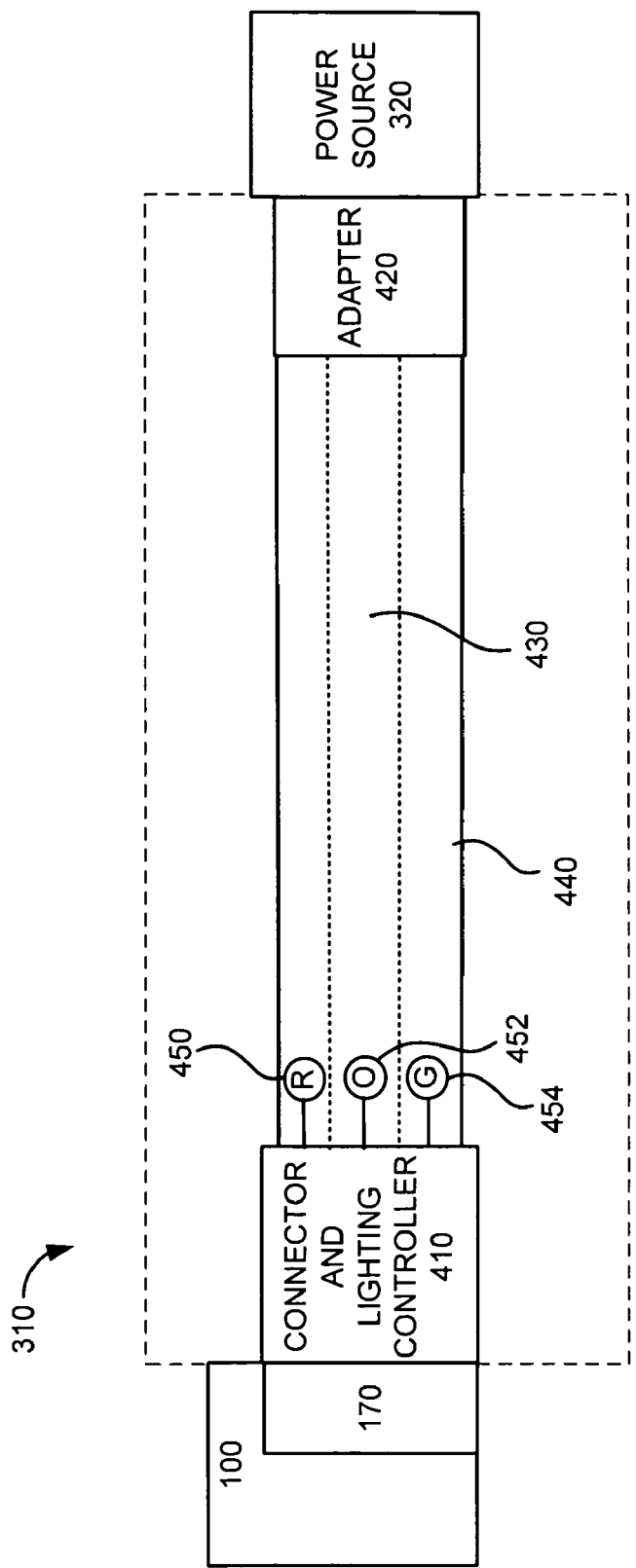
FIGS. 4A and 4B are block diagrams illustrating exemplary components implemented in the device of FIG. 3.

FIG. 4A illustrates an exemplary detailed diagram of cable 310 coupled to connector 170 and power source 320, according to a first implementation. Referring to FIG. 4A, the elements shown inside the dotted box may correspond to components included in cable 310. In other implementations, one or more of the components illustrated as being part of cable 310 may be located externally with respect to cable 310. Cable 310 may include connector and lighting controller 410, adapter 420, inner portion 430, outer portion 440, and light sources 450, 452 and 454. Connector and lighting controller 410 may include a proprietary connector that is compatible with a particular device, such as user device 100. Alternatively, connector and lighting controller 410 may include a universal serial bus (USB) connector that interfaces with connector 170 and is compatible with many different types of user devices. In each case, connector and lighting controller 410 may include circuitry for driving one or more light sources, such as light sources 450, 452 and 454, based on a charge status of user device 100, as described in detail below.

Adapter 420 may connect to power source 320 and include components for converting alternating current (AC) power to direct current (DC) power for charging user device 100. For example, adapter 420 may include a plug that connects to power source 320 via a wall outlet and converts 110-240 volts (V) AC to the proper DC voltage (e.g., 5 V DC) for charging battery 260 of user device 100.

Inner portion 430 of cable 310, located between the dotted lines in FIG. 4A may include conventional electrical conductors that carry current output by adapter 420 to connector 170 via connector and lighting controller 410. Inner portion 430 may also be flexible and may include electrical insulation and other components for facilitating the transmission of power from power source 320 to user device 100.

Figure 4B:
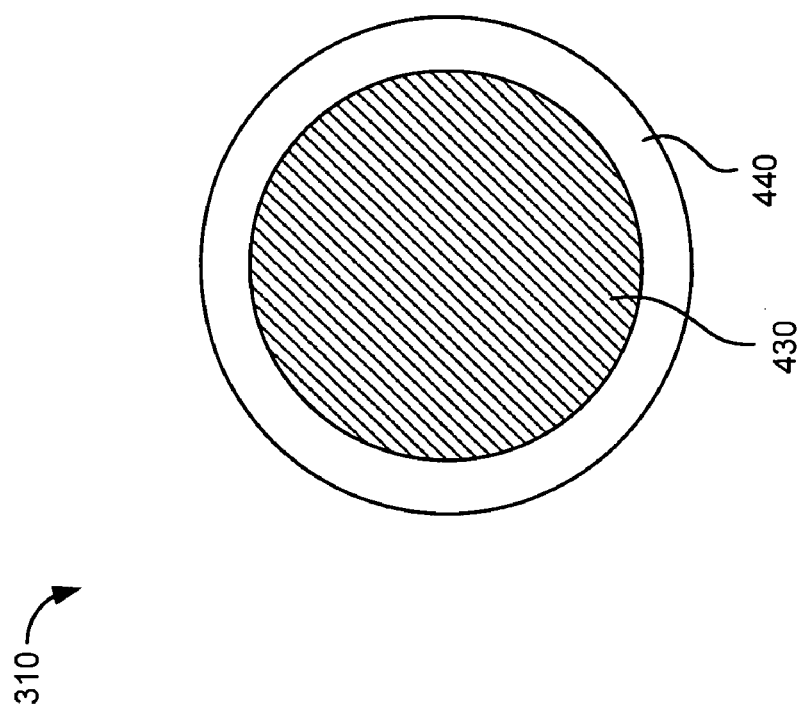

Outer portion 440 of cable 310 may be made of a flexible material and may surround inner portion 430. For example, FIG. 4B illustrates an exemplary cross-section of a portion of cable 310. Referring to FIG. 4B, inner portion 430 may include a number of conductors and insulation represented by the hashed lines. The conductors within inner portion may be surrounded by an insulating material and the overall inner portion may be flexible to allow cable 310 to be run from power source 320 to connector 170 in any number of different configurations that may include a number of bends and turns.

Outer portion 440 of cable 310 may surround inner portion 430 and may be generally cylindrical in shape. Other shapes may be used in alternative implementations. In an exemplary implementation, outer portion 440 may include a flexible material that enables cable 310 to include a number of bends and turns. Outer portion may also be transparent or translucent to enable a user to view color transmitted by one of light sources 450-454 through outer portion 440, as described in detail below. For example, outer portion 440 may be made of a transparent or at least partially transparent or translucent plastic material that allows light transmitted from a light source within cable 310 to be visible to someone viewing cable 310 from a distance (e.g., more than a couple feet away).

Referring back to FIG. 4A, light sources 450, 452, and 454 may represent any type of light sources, such as light emitting diodes (LEDs), organic LEDs (OLEDs), incandescent light sources, etc., that emit light. In an exemplary implementation, light sources 450-454 may include different colored light sources that may be used to indicate the charge state of user device 100.

For example, light sources 450, 452 and 454 may represent red, orange and green LEDs, respectively, as indicated by the letters R, O and G in FIG. 4A It should be understood that other color light sources may be used in alternative implementation. When user device 100 is being charged, one of light sources 450, 452 or 454 may be activated to emit light that indicates the charge state of user device 100. The light emitted from the activated light source may travel the length of outer portion 440 and be visible to a user from a distance. Based on the particular color, the user may be able to quickly determine the charge state of user device 100 (e.g., fully charged, partially charged, not charged). In some implementations, reflectors or other light guiding or amplification mechanisms (not shown in FIG. 4A) may be used to ensure that light emitted from light sources 450-454 is transmitted the entire length of cable 310 so that all or most of cable 310 appears as a certain color.

As described previously, connector 170 may be a USB type connector or another type of connector that connects to connector and lighting controller 410 for charging user device 100. For example, in on implementation, connector 170 may include pins for receiving power, such as a ground (GND) pin and a DC input/output pin (DC 10) pin, along with pins for receiving and/or transmitting data or control signals, such as a D+ pin and a D− pin. In such instances, connector and lighting controller 410 may include a corresponding connector (e.g., a USB connector) that mates with the USB type connector 170 of user device 100. In other instances, connector 170 may be a proprietary connector and in these instances, connector and lighting controller 410 may include a corresponding proprietary connector that mates with connector 170 of user device 100. In each case, cable 310 may operate to provide power to user device 100 via connector 170 to charge battery 260 of user device 100, as described in detail below.

Figure 5:
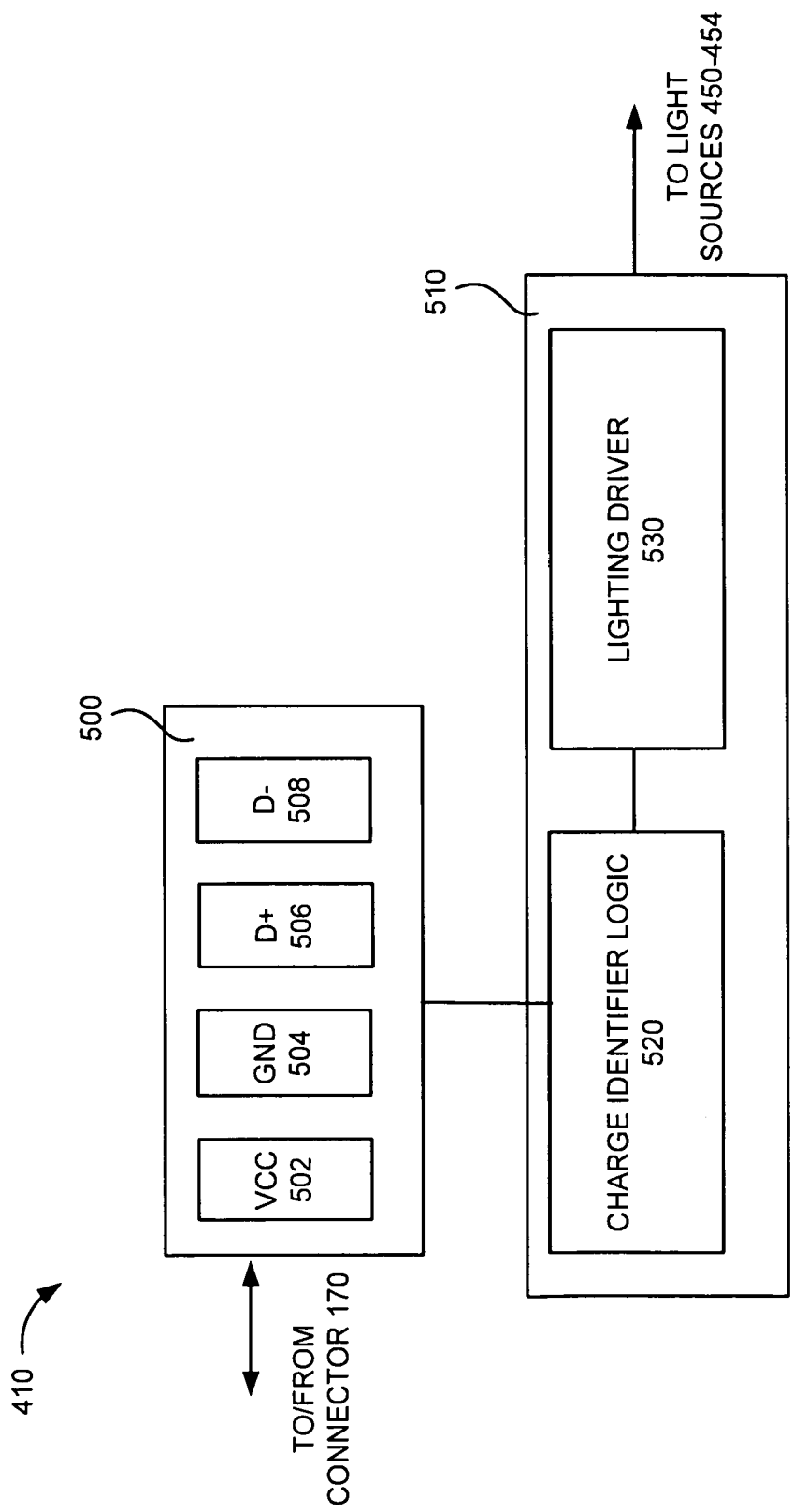
FIG. 5 illustrates exemplary components implemented in a portion of the device of FIG. 4A.

FIG. 5 illustrates connector and lighting controller 410 in an exemplary implementation. In this implementation, connector 170 may be a USB type connector or a USB compatible connector. Referring to FIG. 5, connector and lighting controller 410 may include a connector 500 and lighting controller 510. Connector 500 may include VCC pin 502 and ground (GND) pin 504 for transmitting DC power to charge/power user device 100. Connector 500 may also include D+ pin 506 and D− pin 508 for transmitting and/or receiving control signals or data signals to/from connector 170. These data pins may be used to query and/or receive information regarding the charge state of user device 100, as described in detail below.

Lighting controller 510 may include charge identifier logic 520 and lighting driver 530. In an exemplary implementation, charge identifier logic 520 may include a processor, microprocessor, ASIC, FPGA, processing logic or other circuitry that receives information regarding the charge state of user device 100. Charge identifier logic 520 may signal lighting driver 530 to activate one or more of light sources based on the charge state of user device 100.

Lighting driver 530 may include circuitry and components to drive light sources 450-454, based on output from charge identifier logic 520. For example, lighting driver 530 may include a switch and/or other components that provide a driving voltage to activate and/or bias one of light sources 450-454 to emit light based on the charge status of user device 100, as described in detail below.

Figure 6:
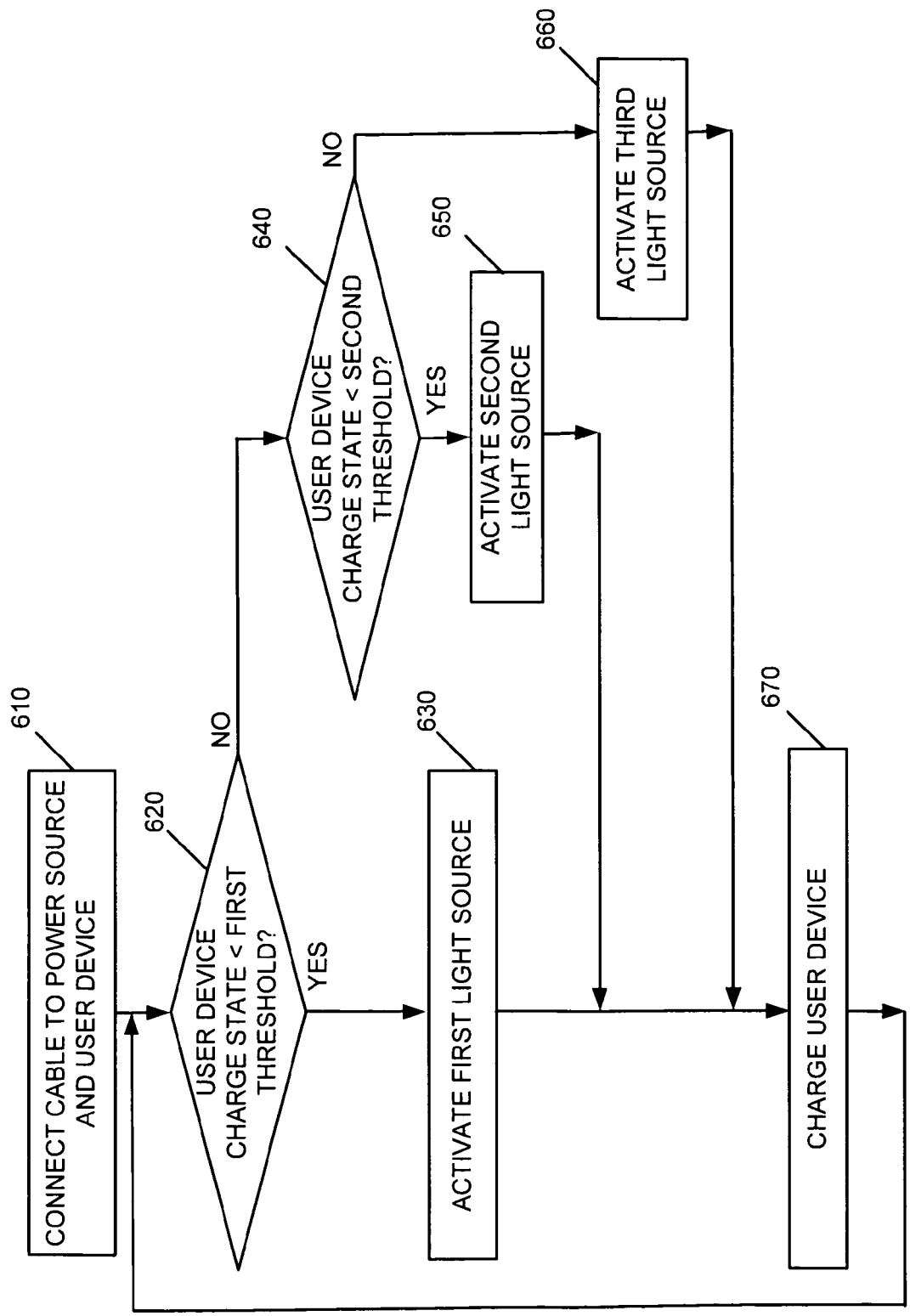
FIG. 6 illustrates exemplary processing associated with charging a battery powered device.

FIG. 6 is a flow diagram illustrating exemplary processing associated with charging user device 100. Processing may begin when a user wishes to charge user device 100 from power source 320. The user may connect adapter 420 of cable 310 to power source 320 and also connect connector and lighting controller 410 to connector 170 of user device 100 (act 610).

Processor 220 in user device 100 may periodically identify the charge status of battery 260 of user device 100 and/or receive information from battery 260 identifying the charge status. The particular sampling interval or period for identifying the charge status of battery 260 may be every five seconds, 30 seconds, one minute, five minutes or some other time interval/period. In some implementations, the charge status information may be output graphically and/or via text on display 130 to allow the user to know the charge status of user device 100. In an exemplary implementation, charge identifier logic 520 may query processor 220 and/or battery 260 of user device 100 to determine the charge status. In other implementations, processor 220 may forward the charge status information to charge identifier logic 520 at predetermined intervals without being queried. In either case, processor 220 may output the charge status information on D+ and D− pins of connector 170 that are coupled to D+ pin 506 and D− pin 508, respectively.

Assume that charge identifier logic 520 receives the charge status information from user device 100. The information received by charge identifier logic 520 may indicate or be correlated to a percentage of a fully charged battery that ranges from 0% to 100%. For example, information corresponding to 0% may indicate that battery 260 is in a totally uncharged or dead state, and information corresponding to 100% may indicate that battery 260 is fully charged. Charge identifier logic 520 may then determine whether the charge status is below a first threshold (act 620). In an exemplary implementation, the first threshold may be 10%. However, in other implementations, other thresholds may be used. Assume that charge identifier logic 520 determines that the charge status of battery 260 is below the first threshold (act 620—yes). In this case, charge identifier logic 520 may activate a light source that represents that user device 100 is in an "uncharged" state (act 630). For example, charge identifier logic 520 may output a signal to lighting driver 530 to active light source 450 (act 630). For example, as discussed above, light source 450 may emit red light. The red light may be transmitted the entire length of cable 310 from connector and lighting controller 410 to adapter 420. Since outer portion 440 of cable 310 may be transparent or translucent, the entire cable 310 will appear red in color. As a result, when battery 260 is in an uncharged (or low-charged) state (e.g., less than 10% charged), cable 310 appears red in color. A person located quite a distance away (e.g., 10 or more feet) may then be able to look at cable 310 as user device 100 is being charged and quickly determine that user device 100 is in an uncharged state, as opposed to the user having to pick up user device 100 and press one or more buttons to determine the charge state.

If charge identifier logic 520 determines that the charge state of battery 260 is not less than the first threshold, which is 10% in this example, (act 620—no), charge identifier logic 520 may determine whether the charge state of battery 260 is less than a second threshold (act 640). In an exemplary implementation, the second threshold may be 60%. However, in other implementations, other thresholds may be used.

Assume that charge identifier logic 520 determines that the charge state of battery 260 is less than the second threshold (act 640—yes). In this case, charge identifier logic 520 may activate a light source that represents that user device 100 is in a "partially charged" state (act 650). For example, charge identifier logic 520 may output a signal to lighting driver 530 to active light source 452 (act 650). For example, as discussed above, light source 452 may emit orange light. The orange light may be transmitted the entire length of cable 310. As discussed above, since outer portion 440 of cable 310 is transparent or translucent, the entire cable 310 will appear orange in color. As a result, when battery 260 is in a partially charged state (e.g., between 10% and 60% charged), cable 310 appears orange in color. A person located quite a distance away (e.g., 10 or more feet) may then be able to view cable 310 and quickly determine that user device 100 is in a partially charged state without having to pick up user device 100 to determine its charge state.

Returning to act 640, assume that charge identifier logic 520 determines that the charge state of battery 260 is not less than the second threshold (act 640—no). In this case, charge identifier logic 520 may activate a light source that represents that user device 100 is in a "charged" state (act 660). For example, charge identifier logic 520 may output a signal to lighting driver 530 to active light source 454. As discussed above, light source 454 may emit green light. The green light may be transmitted the entire length of cable 310. Since outer portion 440 of cable 310 is transparent, the entire cable 310 will appear green in color. As a result, when battery 260 is in a charged state (e.g., at least 60% charged), cable 310 appears green in color. A person located quite a distance away (e.g., 10 or more feet) may then be able to look at cable 310 and quickly determine that user device 100 is in a charged state without having to pick up user device 100 to determine its charge state.

Concurrently with the determination regarding the charge state of battery 260, battery 260 may be charging via power source 320 (act 670). That is, once cable 310 is connected to power source 320 and user device 100, user device 100 may be charging. Charge identifier logic 520 may periodically query user device 100 (e.g., processor 220 and/or battery 260) for charge state information and/or user device 100 may periodically provide this information to user device 100 without charge identifier logic 520 querying user device 100. The particular sampling interval or period for identifying the charge state of battery 260 may be every five seconds, 30 seconds, one minute, five minutes or some other time interval/period. In each case, processing may return to act 620 at each sampling interval/period to determine the charge status of battery 260 and cable 310 may activate the appropriate light(s) based on the charge status.

In the manner described above, cable 310 may include components that interact with user device 110 to identify the status of battery 260 and activate a particular light source based on the charge status. A user may then be able to view the color of cable 310 to quickly ascertain the charge state of user device 100. As described above, different colored lights may be used to illuminate cable 310 and provide an indication as to the charge state of user device 100. In other implementations, cable 310 may include a string of different colored lights, where different portions of the light string are activated based on the charge status.

Figure 7A:
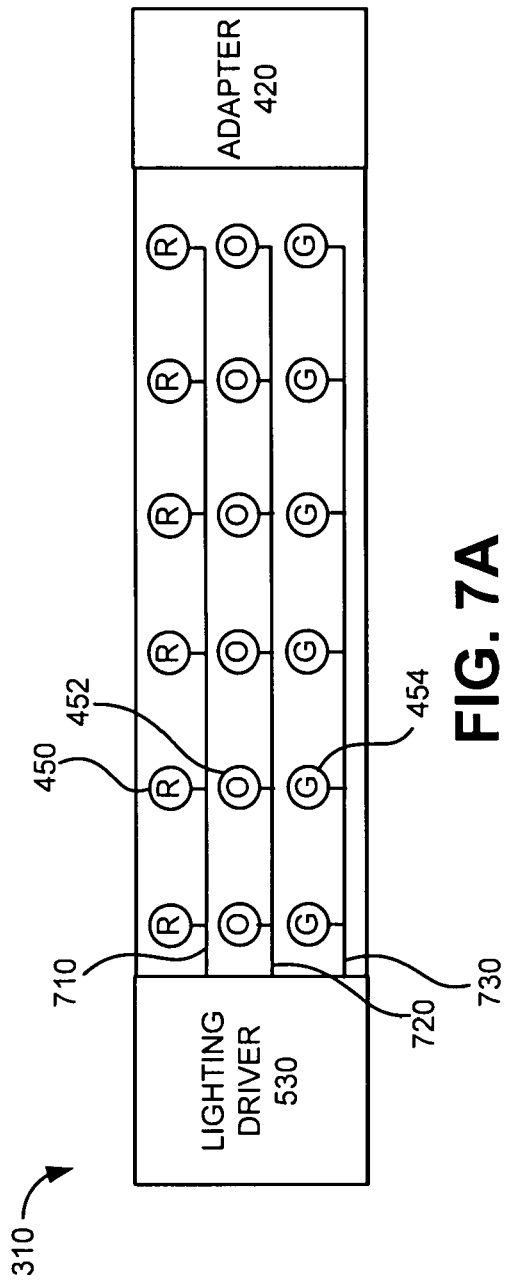
FIGS. 7A and 7B illustrate components implemented in the device of FIG. 3 in accordance with alternative implementations.

For example, FIG. 7A illustrates a portion of cable 310 consistent with another exemplary implementation. It is noted that connector 500 and charge identifier logic 520 are not illustrated in FIG. 7A for simplicity. Referring to FIG. 7A, lighting driver 530 may be coupled to strings of red, orange and green light sources 450-454 (labeled R, O and G) via buses 710, 720 and 730, respectively. In one implementation, when charge identifier logic 520 (not shown in FIG. 7A) determines that battery 260 is currently charged to a level that is less than the first threshold (e.g., less than 10%), lighting driver 530 may activate all of the red light sources 450. When charge identifier logic 530 determines that battery 260 is currently charged to a level that is greater than the first threshold and less than the second threshold (e.g., between 10% and 60%), lighting driver 530 may activate all of the orange light sources 452. Similarly, when charge identifier logic 530 determines that battery 260 is currently charged to greater than the second threshold (e.g., greater than 60%), lighting driver 530 may activate all of the green light sources 454. In this manner, the color of cable 310 may be brighter than if a single light source is used, which may allow the user to ascertain the color and corresponding battery status from a greater distance.

Figure 7B:
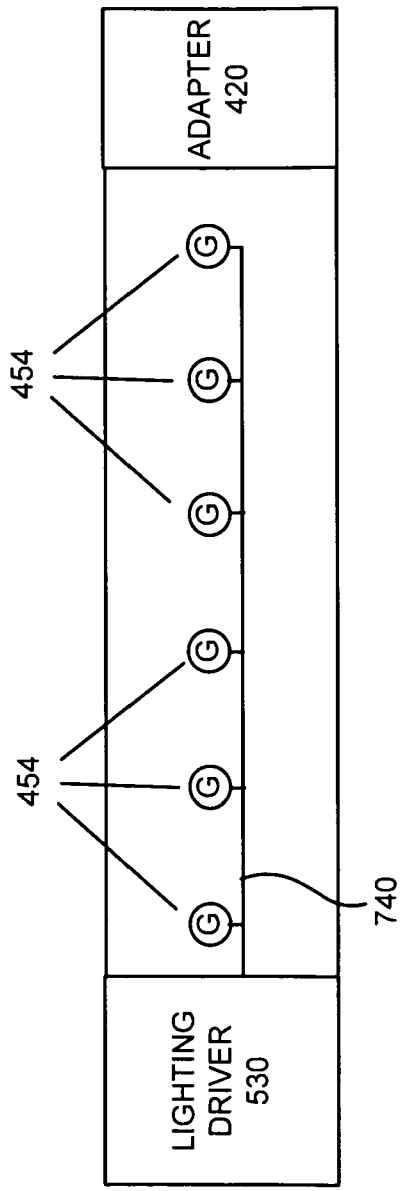

In still another implementation, cable 310 may include a single string of lights having the same color, where the portion of the lights that are activated may identify the charge status. For example, FIG. 7B illustrates a portion of cable 310 consistent with another exemplary implementation. Similar to FIG. 7A, connector 500 and charge identifier logic 520 are not illustrated in FIG. 7B for simplicity. Referring to FIG. 7B, lighting driver 530 may be coupled to a string of green light sources 454 via bus 740. In other implementations, other colored light sources may be used. In an exemplary implementation, when charge identifier logic 520 determines that battery 260 is currently charged to a level that is less than the first threshold (e.g., less than 10%), lighting driver 530 may activate only one or none of the green light sources 454. When charge identifier logic 530 determines that battery 260 is currently charged to a level greater than the first threshold, but less than the second threshold (e.g., between 10% and 60%), lighting driver 530 may activate two or more of light sources 454 (e.g., up to 60% of the light sources 454) based on the particular charge level. Similarly, when charge identifier logic 520 determines that battery 260 is currently charged to a level greater than the second threshold (e.g., greater than 60%), lighting driver 530 may activate four or more of the green light sources 454 (e.g., from 60% to all of the light sources 454) based on the particular charge level.

In this manner, a user may be able to ascertain the charge status of user device 100 based on the portion of cable 310 that is illuminated. In such an implementation, lighting shields may be used to ensure that light emitted from one light source 454 located at the end of cable 310 located closest to user device 100 may not be transmitted laterally down the length of cable 310 toward adapter 420, and is merely transmitted in an axial direction with respect to cable 310. In this manner, cable 310 may operate as a continuous monitor or display mechanism in which the portion of cable 310 that is illuminated increases as the charge level of battery 260 increases. For example, when battery 260 is in an uncharged state, no portion or only a very small portion of cable 310 may be illuminated, while when battery 260 is 50% charged, approximately half of cable 310 may be illuminated, and when battery 260 is 100% charged, all or most of cable 310 may be illuminated.

In some implementations, different colored lights may be used in a manner similar to that described above with respect to FIG. 7B. For example, the portion of lights located closest to lighting driver 530 in FIG. 7B may be red light sources, the portion of light sources located in the middle of cable 310 may be orange light sources and the portion of light sources located at the end of cable 310 located closest to adapter 420 may be green light sources. In such implementations, a multi-colored display mechanism (i.e., cable 310 illuminated with different colors) may be provided to alert the user as to the charge status of user device 100.

As discussed above, various colored lights may be used to identify the charge status of a user device 100. In other implementations, the light sources may be pulsed to provide a unique visual effect. For example, when user device 100 is charged (e.g., greater than 60% charged), green light sources 454 may be pulsed to alert the user that the device is charged.

In an alternative implementation, a single light source may be used in connection with pulsing to allow a user to identify the charge status of user device 100. For example, a single light source may be pulsed at a very low frequency when user device is in an uncharged or very low charge state (e.g., less than 10% charged). As user device 100 becomes more fully charged (e.g., between 10% and 60% charged), the single light source may pulse at a higher frequency. When user device 100 becomes charged (e.g., greater than 60% charged), the single light source may pulse at an even higher frequency. In some instances, when user devices 100 becomes 100% charged, the light source may pulse at still a higher frequency. Alternatively, when user device 100 becomes 100% charged, the pulsing may cease and the light source may stay activated continuously. The user of user device 100 may then look at cable 310 and quickly determine the charge status based on the pulsing rate of the light source and/or lack of pulsing of the light source.

As also discussed above, in exemplary implementations, outer portion 440 of cable 310 may be made from a transparent or translucent material. In alternative implementations, outer portion of cable 310 may include a waveguide, such as an optical waveguide, that allows light to be transmitted in a lateral direction from one end of cable 310 to the other end of cable 310. In such implementations, optical openings or slits in the optical waveguide may be located intermittently along the length of cable 310 to allow light to escape via these openings. In this manner, a single light source may produce the effect of having several light sources. That is, each opening or slit in the optical waveguide may allow light to escape and be visible to a person viewing cable 310 from a distance, making it appear as those separate individual light sources are emitting light from each opening. In this manner, a single light source (or multiple individual light sources each emitting a different colored light) may be used to appear as multiple light sources. In addition, in this implementation, outer portion 440 of cable 310 may be made from material that may not be transparent or translucent.

In still other implementations, text may be output via cable 310 to identify the charge status of user device 100. For example, LEDs or other light sources disposed in the outer portion 440 of cable 310 may be activated to spell out the charge status (e.g., "uncharged," "partially charged," "fully charged") to allow the user to view the text and ascertain the corresponding charge status of user device 100.

Still further, in some implementations, user device 100 may include light sources that display a particular color based on the charge status of user device 100. For example, light sources located on the perimeter (or elsewhere) of user device 100 may be illuminated based on the charge status of user device 100. A user may then view user device 100 and quickly ascertain the charge status. In some implementations, both cable 310 and user device 100 may be illuminated with a certain color based on the charge status.

CONCLUSION

Implementations described herein provide visual effects for allowing a user to easily ascertain the charge status of a battery powered device. This allows the user to simply glance at the user device and/or charging cable and quickly determine the charge status, as opposed to picking up the user device to determine the charge status.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, aspects described herein focus on use of various light sources to identify the charge status of a user device. In other implementations, other types of output may be used to identify the charge status. For example, user device 100 may output audible information identifying the charge status. As one example, speaker 120 may periodically output audio information identifying the charge status of user device 100. As another example, speaker 120 may periodically output a snippet of a song when user device 100 is fully charged. In some instances, the audio output may be used in connection with a proximity detector that detects a person. For example, when a proximity sensor included in user device 100 detects movement, indicating that a person may be located relatively close to user device 100, user device 100 may output the audio information identifying the charge status.

In addition, aspects have been described above with respect to circuitry and/or control devices included in cable 310 that connects to user device 100 while user device 100 is charging. In other implementations, some or all of the circuitry and components described above as being include in cable 310 may be included in user device 100. For example, user device 100 may include all or most of the lighting driver circuitry. In such implementations, light sources in cable 310 may be driven by circuitry included in user device 100 and the drive/control signals may be provided to cable 310 via connector 170. In still other instances, the light sources described as being included within cable 310 may be included in user device 100 and light from such light sources may be transmitted through a transparent or translucent portion of cable 310 via various light guides and/or reflectors.

Still further, aspects have been described above with respect to using various light sources to identify the charge status of user device 100. In some implementation, various light sources may be used to indicate other information with respect to the operation of user device 100. For example, suppose that user device 100 receives an incoming communication (e.g., phone call, text message, etc.) while user device 100 is charging. In some implementations, various light sources in cable 310 may be activated or pulsed to allow the user to view cable 310 and quickly determine that a communication is currently being received or has been received while user device 100 has been charging. The particular color of light and/or light pattern may be based on the particular type of incoming communication. For example, a blue light source may be used to indicate that a telephone call was received and a yellow light source may be used to indicate that a text message was received. In some instances, the color of cable 310 may be pulsed between the color used to indicate the charge status (e.g., red, orange or green) with the color used to indicate that a communication was received (e.g., blue, yellow). In other instances, the same light sources used to indicate the charge status may be used to indicate that an incoming communication was received. For example, if red, orange and green light sources are activated to identify the charge level, these same light sources may be pulsed when an incoming communication has been received. That is, when no communications have been received, the color of cable 310 is steady, while when a communication has been received, the particular light sources may pulse to indicate that an incoming communication has been received while user device 100 has been charging. In this manner, one or more light sources may be used to alert the user of user device 100 as to other types of status information with respect to the operation of user device 100.

In addition, the exemplary implementations described above refer to particular charge levels that correspond to lighting various light sources and particular types/numbers of light sources that may be illuminated based on the charge state. It should be understood that other charge status levels and any combination of lighting techniques may be used in alternative implementations to provide similar functionality that allows the user to easily ascertain the charge status of a battery powered device.

Further, while series of acts have been described with respect to FIG. 6, the order of the acts may be varied in other implementations consistent with the invention. Moreover, non-dependent acts may be performed in parallel.

It will also be apparent to one of ordinary skill in the art that aspects of the invention, as described above, may be implemented in, for example, charging cables, computer devices, cellular communication devices/systems, media playing devices, methods, and/or computer program products. Accordingly, aspects of the present invention may be embodied in hardware and/or in software (including firmware, resident software, micro-code, etc.). Furthermore, aspects of the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as a processor, a microprocessor, an ASIC, or an FPGA, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A system, comprising:
   a battery powered device; and
   a cable comprising:
      a first connector located at a first end of the cable, the first connector being configured to connect to the battery powered device,
      a second connector located at a second end of the cable, the second connector being configured to connect to a power source,
      a flexible portion located between the first connector and the second connector, the flexible portion including an inner portion comprising at least one electrical conductor and an outer portion comprising at least one of a transparent or translucent material,
      at least one light source, and
      circuitry configured to:
         activate the at least one light source based on a charge status of the battery powered device, wherein the activated at least one light source is configured to illuminate at least a portion of the outer portion of the flexible portion.

2. The system of claim 1, wherein when activating the at least one light source, the circuitry is configured to:
   activate a first light source when a battery included in the battery powered device is charged to a level less than a first threshold,
   activate a second light source when the battery is charged to a level greater than the first threshold and less than a second threshold, and
   activate a third light source when the battery is charged to level greater than the second threshold.

3. The system of claim 2, wherein the first threshold corresponds to approximately 10% of a full charge for the battery and the second threshold corresponds to approximately 60% of a full charge for the battery.

4. The system of claim 2, wherein the first, second and third light sources comprise different colored light sources.

5. The system of claim 2, wherein the first light source comprises a red light emitting diode and the third light source comprises a green light emitting diode.

6. The system of claim 1, wherein the circuitry comprises a controller configured to at least one of receive charge state information from the battery powered device via the first connector, or query the battery powered device for charge state information via the first connector.

7. The system of claim 1, wherein the at least one light source comprises:
   a first plurality of light sources configured to emit a first color of light when the battery powered device is charged to a first level,
   a second plurality of light sources configured to emit a second color of light when the battery powered device is charged to a second level, wherein the second level is greater than the first level, and
   a third plurality of light sources configured to emit a third color of light when the battery powered device is charged to a third level, wherein the third level is greater than the second level, and
   wherein the first, second and third pluralities of light sources are located in the flexible portion of the cable.

8. The system of claim 1, wherein the at least one light source comprises a plurality of light sources disposed along a length of the flexible portion of the cable, wherein the circuitry is configured to:

activate a first number of the light sources when the charge status of the battery powered device is below a first level,
activate a second number of the light sources when the charge status of the battery powered device is greater than the first level and less than a second level, and
activate a third number of the light sources when the charge status of the battery powered device is greater than the second level, and
wherein the first number is less than the second number and the second number is less than the third number.

9. The system of claim 1, wherein the at least one light source comprises a plurality of light sources, and the circuitry comprises a controller configured to:
activate an increasing number of the plurality of light sources as the charge level of the battery powered device increases.

10. The system of claim 1, wherein the at least one light source comprise a plurality of light sources, and the circuitry comprises a controller configured to activate at least some of the plurality of light sources to display at least one word corresponding to a charge level of the battery powered device, the at least one word being visible on the outer portion of the flexible portion of the cable.

11. The system of claim 1, wherein the battery powered device comprises at least one of a mobile telephone, a personal digital assistant, a laptop computer or a media playing device.

12. A cable for charging a device, comprising:
a first connector located at a first end of the cable, the first connector being configured to connect to the device;
a second connector located at a second end of the cable, the second connector being configured to connect to a power source;
a flexible portion located between the first connector and the second connector, the flexible portion comprising at least one electrical conductor and including a transparent or translucent outer portion;
a plurality of light sources; and
control circuitry configured to:
activate at least one of the plurality of light sources based on a charge status of the device, wherein the activated at least one light source is configured to illuminate at least a portion of the outer portion of the flexible portion of the cable.

13. The cable of claim 12, wherein when activating the at least one of the plurality of light sources, the control circuitry is configured to:
activate a first light source when a battery included in the device is charged to a level less than a first threshold,
activate a second light source when the battery is charged to a level greater than the first threshold and less than a second threshold, and
activate a third light source when the battery is charged to level greater than the third threshold.

14. The cable of claim 13, wherein the first, second and third light sources emit different colored light.

15. The cable of claim 12, wherein the control circuitry is configured to activate a second one of the plurality of light sources when the device receives a communication, or pulse the at least one of the plurality of light sources to provide an indication that a communication has been received.

16. The cable of claim 12, wherein the control circuitry is configured to:
activate an increasing number of the plurality of light sources as the device becomes more fully charged.

17. The cable of claim 12, wherein the first connector comprises a universal serial bus (USB) type connector or a USB compatible connector.

18. A method, comprising:
identifying a charge status of a battery powered device; and
activating at least one of a plurality of light sources included in a charging cable coupled to the battery powered device and a power source, the activated light source emitting light through a portion of the charging cable.

19. The method of claim 18, wherein the activating comprises:
activating a first portion of the plurality of light sources when the charge status of the battery powered device is less than a first threshold,
activating a second portion of the plurality of light sources when the charge status of the battery powered device is greater than the first threshold and less than a second threshold, and
activating a third portion of the first plurality of light source when the charge status of the battery powered device is greater than the second threshold.

20. The method of claim 18, wherein the first portion of the plurality of light sources emit a different color of light than at least one of the second portion of the plurality of light sources or the third portion of the plurality of light sources.

* * * * *